United States Patent Office 3,376,269
Patented Apr. 2, 1968

3,376,269
POLYAMIDES CONTAINING ADJACENT
HETEROCYCLE LINKAGES
Jack Preston, Raleigh, N.C., assignor to Monsanto
Company, a corporation of Delaware
No Drawing. Filed Feb. 26, 1964, Ser. No. 347,385
11 Claims. (Cl. 260—78)

This invention relates to new high temperature resistant linear condensation polymers. More particularly, the invention relates to polymers with regularly recurring structural units containing amide linkages and bis-heterocyclic linkages.

Synthetic linear condensation polymers such as polyamides in the form of fibers, filaments, films and other shaped articles have found wide application in textile and other industrial end uses requiring high tensile strength, abrasion resistance, and resistance to thermal and other degradative conditions. Subsequent searching for polymers of improved thermal resistance has produced various heterocyclic polymers such as polyoxadiazoles, polybenzimidazoles, and polyimides. Typical of such polymers are those in U.S. Patents 2,895,948, 2,904,537 and 3,044,994. Such heterocycle polymers have certain characteristics, including heat resistance and resistance to acids and other degradative conditions, which are superior to those of polyamides in general. Wholly aromatic polyamides such as those of U.S. 3,006,899 and 3,049,518 have also been found to be highly resistant to high temperatures. This invention presents polymers which combine the desirable qualities and characteristics of both aromatic polyamides and heterocycle polymers.

Accordingly, it is an object of this invention to provide new compositions of matter and a process for their preparation.

Another object of this invention is the provision of novel amideheterocycle polymers which are characterized by the fact that they have amide and two adjacent heterocyclic linkages in each repeating unit which appear in a perfectly regular sequence along the polymer chain, each amide and each pair of adjacent heterocyclic linkages being separated by an aromatic radical, the polymers further being characterized by the fact that there is at least one point in each repeating unit of the polymer through which a plane of symmetry can be drawn.

It is a further object to provide polymers which possess unusual thermal stability.

An additional object of the invention is the provision of fibers, filaments, films and other shaped articles prepared from the amide bis-heterocycle polymers of this invention.

Other objects and advantages will become apparent from the description of the invention which follows hereinafter.

This invention is concerned with the provision and preparation of "symmetrical" amide-heterocycle polymers having the formula

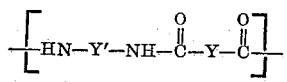

wherein Y and Y' are selected from Ar and Ar-X—X-Ar where Ar is an aromatic divalent radical which may have a single, multiple or fused structure, and X represents a divalent 5 or 6 ring member heterocyclic linkage which contains from one to three hetero elements such as N, S, P, As, O and Se. In the general formula Y and Y' may be the same or different provided that there is at least one Ar-X—X-Ar linkage in each repeating unit. All occurrences of X in the polymer repeating unit must be the same. In each Ar-X—X-Ar linkage the two heterocyclic radicals are joined to each other by a single common carbon to carbon valence bond.

The use of the term "symmetrical" herein is intended to relate to a characteristic of the polymers of this invention which may be described by the fact that there is at least one point in each repeating unit of the polymers through which a plane of symmetry can be drawn. For example, repeating units may be shown as follows:

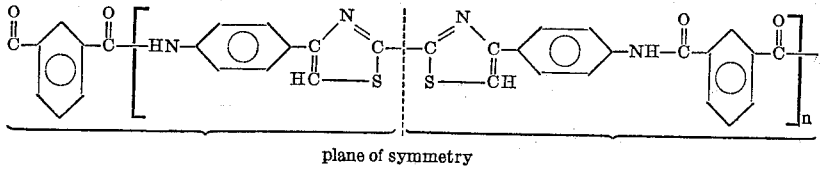

mirror image half    plane of symmetry    mirror image half and

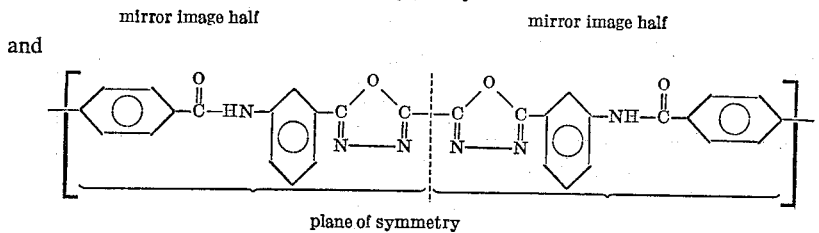

mirror image half    plane of symmetry    mirror image half wherein a plane of symmetry as indicated by the dotted line shows that the repeating unit consists of two halves which are mirror images of each other.

The heterocyclic linkages are exemplified by

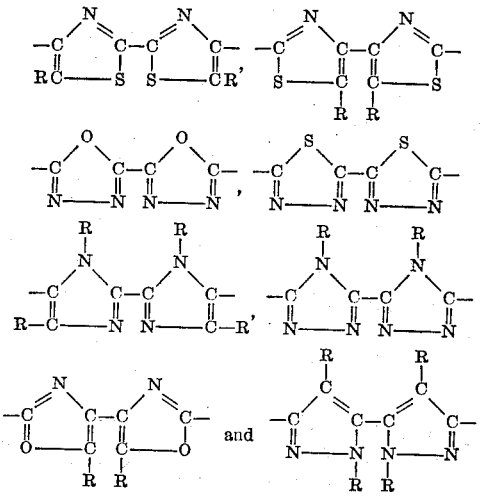

where R=H, lower alkyl or phenyl.

Suitable aromatic linkages include
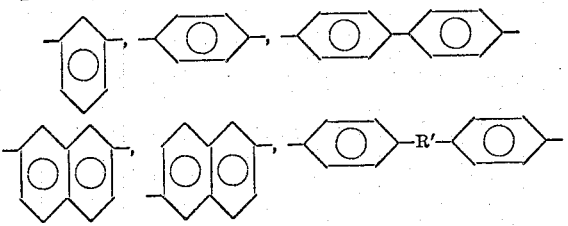
where R' is —O—, —S—, —SO$_2$— and the like.
As examples of the polymers of this invention the following may be cited:
(1)
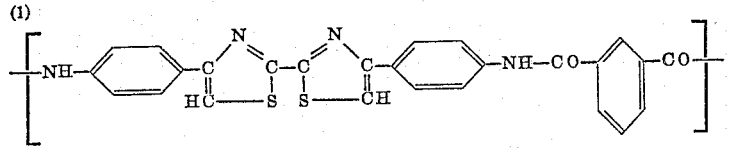
(2)
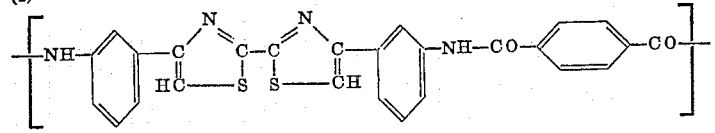
(3)
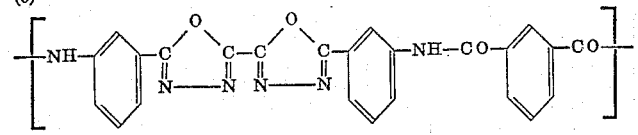
(4)
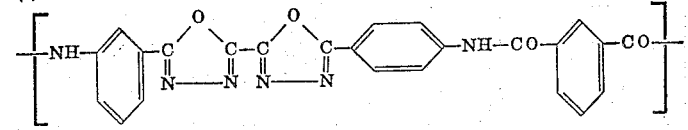
(5)
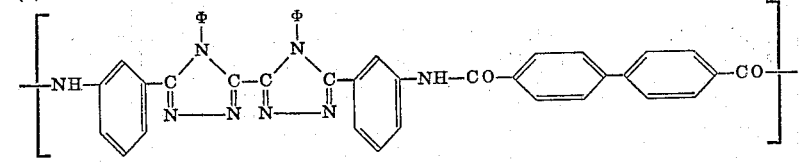
(6)
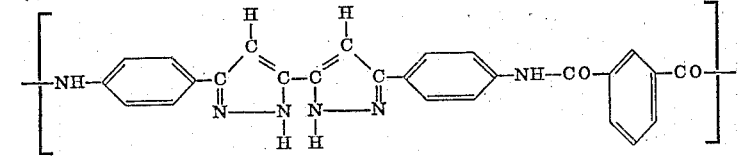
(7)
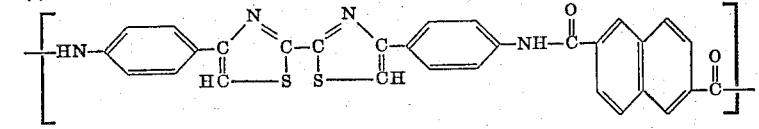
(8)
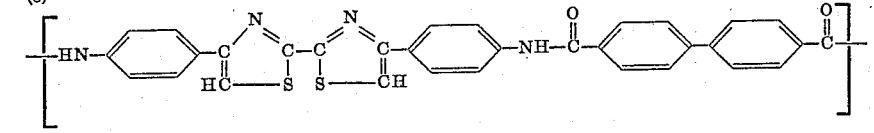
(9)
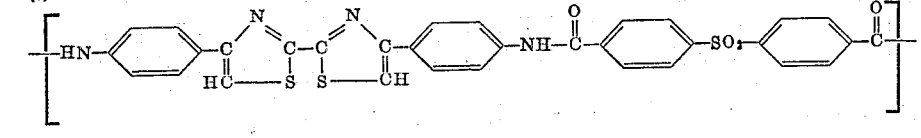

(10) 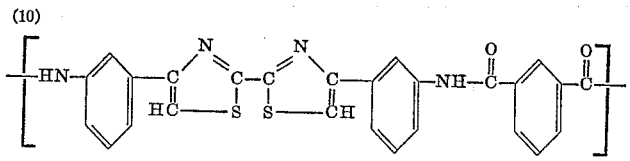

(11) 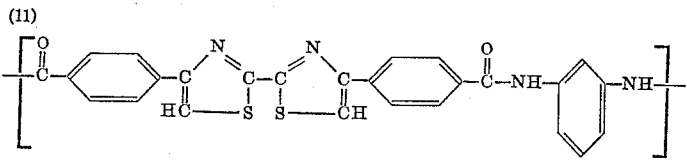

(12) 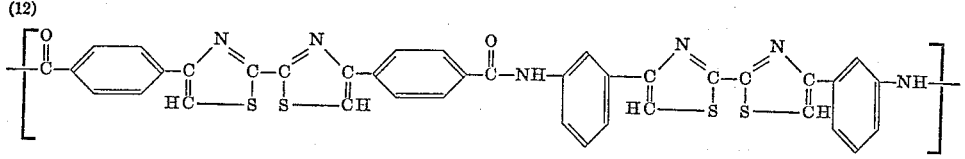

The polymers of this invention may be prepared by reacting together two monomers, each containing functional groups which react with the functional groups of the other to produce a polymer containing amide and two or four heterocyclic linkages in each repeating unit which appear in a perfectly regular sequence along the polymer chain. Thus, the polymers may be prepared via the reaction of an aromatic diacid chloride with an aromatic diamine containing two heterocyclic linkages separated by an aromatic linkage or from the reaction of an aromatic diacid chloride containing two heterocyclic linkages separated by an aromatic linkage with an aromatic diamine. An alternate route to the polymers of this invention employs the reaction of a monomer containing preformed amide linkages and functional groups which, when reacted with the functional groups of a second monomer, produce heterocyclic linkages. The polymerization of the reactants is a condensation reaction which may be conveniently conducted by interfacial or solution polymerization methods, by heating of stoichiometric amounts of reactants and the like.

The following equations are exemplary of how the polymers of the invention can be prepared:

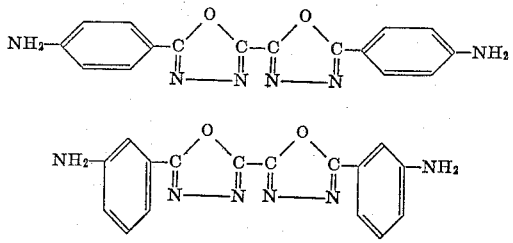

The methods of preparation of the diamines of this invention in general are described by P. Karrer et al., Helv. 28, 820 (1945), and R. Stollé, J. für praktische chem., 68, 139 (1903). Conveniently, it involves the preparation of dinitro intermediate which is then reduced to the diamine compound containing heterocyclic linkages.

The dinitro intermediate may be prepared by any of several well known methods. A 1,3,4-oxadiazole linkage may be formed from a hydrazide linkage which may be formed in solution or via a Schotten-Baumann reaction. The Schotten-Baumann or interfacial type reaction in-

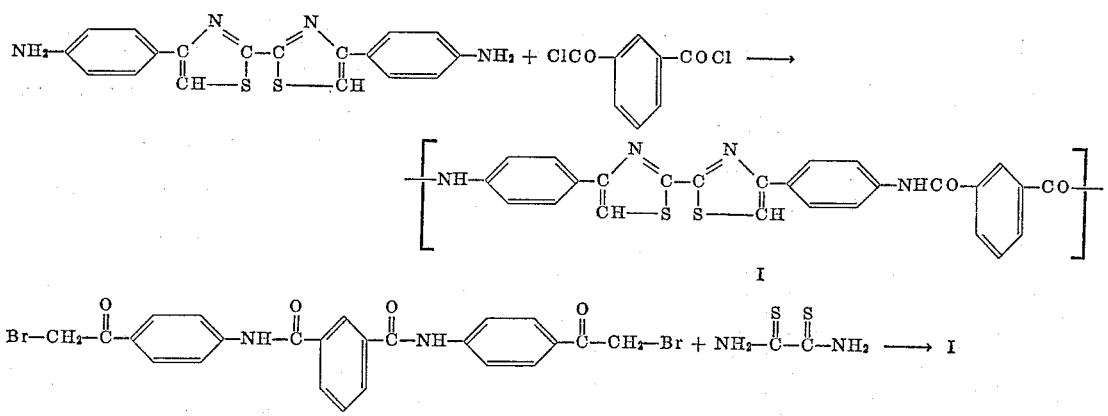

Of the several routes to the preparation of the polymers of this invention, the polymerization of an aromatic diamine containing two adjacent heterocyclic linkages, i.e., a bis-heterocyclic linkage, is typical.

As examples of the diamines which may be used in the practice of this invention, the following are typical and illustrative.

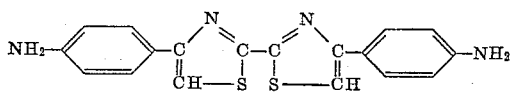

volves the use of a nitroaromatic acid chloride either alone or in a suitable solvent which will dissolve the acid chloride and which will at the same time not adversely affect the other component which is dissolved or dispersed in water. Suitable solvents include chloroform, tetrahydrofuran, benzene, benzonitrile, acetophenone, acetontrile, dimethylacetamide, and other solvents—tetrahydrofuran being preferred. The reaction mixture is then stirred rapidly until the reaction is completed and the dinitro compound is filtered from the reaction mixture. The choice of intermediate reactants will, of course, depend upon the type of heterocyclic linkage desired. For example, the reaction of m-nitrobenzoyl chloride plus oxalic dihydrazide in a basic reaction media will produce a nitro-m-benzoylhydrazide intermediate which may then be converted by a dehydrating agent, such as phosphorous pentoxide, to a dinitro intermediate compound containing a bis-1,3,4-oxadiazole linkage. The hydrazide intermediate may also be produced in a solvent, such as dimethylacetamide. The dintro compound containing the bis-oxadiazole linkage may then be reduced to the diamino compound.

It is also possible to prepare the dinitro hetero-containing intermediate in a one-step synthesis. Other bis-heterocyclic linkages may be preformed readily in the compositions of this invention. Such heterocyclic linkages include: bis - 1,3,4 - thiodiazole, bis-3,5-4-N-phenyl-1,2,4-triazole, bis-pyrazole, bis-oximidazole, etc.

The reduction of the dinitro intermediate to the diamine may be effected by use of catalytic reducing methods such as those involving the use of a palladium on charcoal catalyst typically employing 5 percent palladium on charcoal, a Parr hydrogenation unit or other unit. The reduction may also employ Raney nickel, cobalt and other similar heavy metal catalysts, these catalyst systems usually being effected in an alcohol or in solution in dimethylformamide or similar compounds. Reduction may also be accomplished using chemical reduction methods, such as stannous chloride and hydrochloric acid, iron and sulfuric acid, polysulfide solutions and the like.

Suitable dicarboxylic acids or diacid derivatives which may be used in the practice of the invention include all diacid compounds where the carbonyl radicals are joined by aromatic or bis-heterocyclic-aromatic linkages, for example, aromatic diacid halides, such as isophthaloyl halide and substituted isophthaloyl chlorides such as alkyl, aryl, alkoxy, nitro and other similar isophthaloyl chlorides and isophthaloyl bromides. Examples of such compounds include 4,6-dimethyl-5-propyl isophthaloyl chloride, 2,5-dimethyl isophthaloyl chloride, 2,5-dimethoxy isophthaloyl chloride, 4,6-dimethoxy isophthaloyl chloride, 2,5-diethoxy isophthaloyl chloride, 5-propoxy isophthaloyl chloride, 5-phenyl isophthaloyl chloride, 2-methyl-5-phenyl isophthaloyl chloride, 2,5-dinitro isophthaloyl chloride, 5-nitro isophthaloyl chloride and the like. Terephthaloyl chloride or terephthaloyl bromide may also be used and may be substituted in the manner described above for isophthaloyl chloride. Examples of terephthaloyl chlorides include 2,6-dimethyl terephthaloyl chloride, tetramethyl terephthaloyl chloride, 2-methoxy terephthaloyl chloride, 2-nitro terephthaloyl chloride and the like.

These diacid monomers may be prepared by any of the will known prior art methods used to prepare aromatic diacid compounds. For example, oxidation of xylenes.

The polymers of the invention may be obtained by any of the well known condensation polymerization techniques such as solid state, melt, interfacial or solution polymerization techniques.

The solution polymerization method generally involves dissolving the diamine in a suitable solvent which is inert to the polymerization reaction. Among such solvents there may be mentioned dimethylacetamide, 1-methyl-2-pyrrolidone, 1,5-dimethyl-2-pyrrolidone and the like. These solvents are rendered more effective in many instances by mixing them with a small amount, up to 10 percent, of an alkali or alkaline earth salt such as lithium chloride, lithium bromide, magnesium bromide, magnesium chloride, beryllium chloride, or calcium chloride. The preferred solvent for solution polymerization is dimethylacetamide or dimethylacetamide containing a small amount of dissolved lithium chloride. The diamine solution may be cooled to between 20 and −30° C. and the dicarbonyl monomer may be added either as a solid or in a solution of one of the aforementioned solvents. The mixture may be then stirred for a period of time until polymerization is substantially complete and high viscosity is attained. This highly viscous solution may be spun per se, neutralized with caustic, or the polymer may be isolated by pouring the mixture in a non-solvent, washing and drying the polymer and then preparing the spinning solution.

The interfacial polymerization reaction is conducted by mixing water, an emulsifier and the diamine which may be in the form of its dihydrochloride. A proton acceptor is then added and the mixture is then stirred rapidly. During this rapid stirring a solution of the dicarbonyl monomer in an inert organic solvent is added, the mixture is stirred until polymerization is complete, the polymer is then isolated by filtration and is washed and dried. The dicarbonyl monomer solvent may be any convenient solvent such as a cyclic non-aromatic oxygenated organic solvent such as a cyclic tetramethylene sulfone, 2,4-dimethyl cyclic tetramethylene sulfone, tetrahydrofuran, propylene oxide and cyclohexanone. Other suitable dicarbonyl monomer solvents include chlorinated hydrocarbons such as methylene chloride, chloroform and chlorobenzene, benzene, acetone, nitrobenzene, benzonitrile, acetophenone, acetonitrile, toluene and mixtures of the above solvents such as tetrahydrofuran and benzonitrile, tetrahydrofuran and acetophenone or benzene and acetone and the like.

The amounts of the various reactants which may be employed will, of course, vary according to the type of polymer desired. However, in most instances, substantially equimolar quantities or a slight excess of diamine to dicarbonyl may be used. For interfacial polymerization reactions, sufficient proton acceptor to keep the acidic by-products neutralizde may be added, the exact amount easily determined by one skilled in the art.

Suitable emulsifying agents for interfacial polymerization include anionic and nonionic compounds such as sodium lauryl sulfate, nonyl phenoxy(ethyleneoxy) ethane, the sodium or potassium salt of any suitable condensed sulfonic acid and the like.

A proton acceptor as the term is employed herein indicates a compound which acts as an acid scavenger to neutralize HCl, formed during the reaction, and which aids to carry the reaction to completion. Suitable proton acceptors include sodium carbonate, magnesium carbonate, calcium carbonate, tertiary amines, such as triethyl amine, trimethyl amine, tripropyl amine, ethyl dimethyl amine, tributyl amine and similar compounds which react as desired.

The products of this invention are useful in a wide range of applications. In the form of fibers, filaments and films the polymers of this invention are thermally resistant as well as being resistant to acids and other types of chemical degradation. The invention is further illustrated by the following examples in which all parts and percents are by weight unless otherwise indicated. Heat resistant properties of the polymers of the invention were tested by differential thermal analysis (DTA) and thermogravimetric analysis (TGA). Inherent vihcosity values are determined at 30° C. in dimethylacetamide containing 6 percent dissolved lithium chloride, using a concentration of 0.5 g. of polymer per 100 ml. of solvent. Fibers were characterized in general by having good strength retention above 300° C.

EXAMPLE I

Preparation of 4,4′-bis(p-aminophenyl)-2,2′-bithiazole

The diamine used for polymerization (4,4′-bis(p-aminophenyl)-2,2′-bithiazole, diamine A) was prepraed in the following manner:

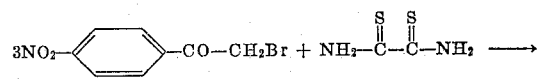

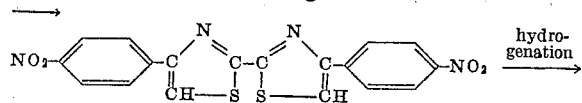

*Analysis.*—Calc'd: C, 61.67; H, 4.02; N, 15.95. Found: C, 61.24; 61.55; H, 4.07; 4.09; N, 15.82; 15.92.

EXAMPLE II

Polymers of 4,4'-bis(p-aminophenyl)-2,2'-bithiazole

Polymers prepared from diamine A may be illustrated by the following structures:

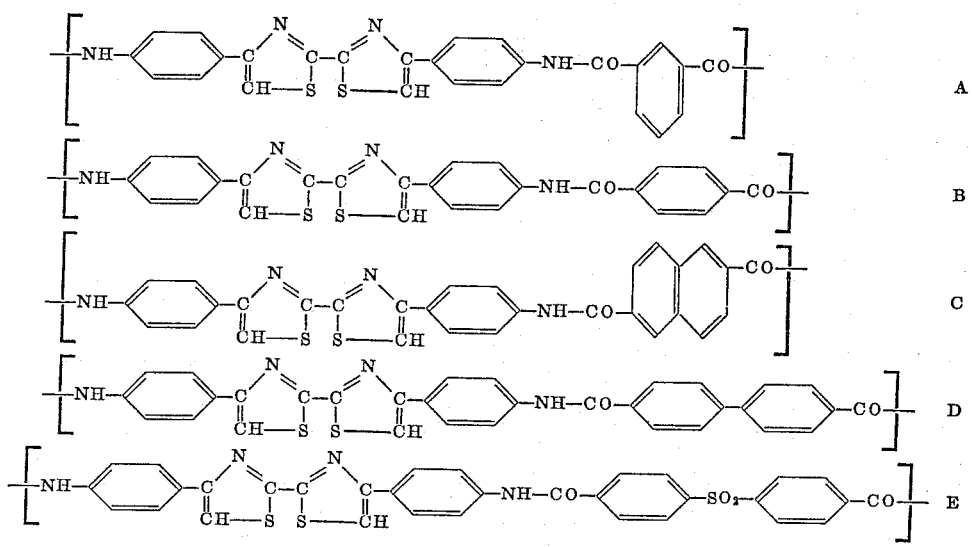

A. To a solution of 48.8 g. (0.2 mole) of 2-bromo-4'-nitroacetophenone in 200 ml. dimethylacetamide (DMAc) was added 12.0 g. (0.01 mole) dithioxamide (rubeanic acid). After 30 minutes, a product began to precipitate from solution. The reaction mixture was stirred overnight, then filtered. The crude product was washed in ethanol and dried to yield 30 g. of material, M.P. 324–326° C. The procedure was repeated 5 times and the total product of the six runs combined to yield 142.1 g. of bluish-green material. The crude product was recrystallized twice from 900 ml. portions of DMAc, then recrystallized a third time from 1.5 liters DMAc to yield 121.9 g. of pure product in the form of long yellow needles, M.P. 325–327° C. Alaternately, the reaction may be run using heat and the product recrystallizes from the reaction mixture.

B. Reduction was effected on the product prepared according to the method in section A above. Thus, 30 g. of 4,4'-bis(p-nitrophenyl)-2,2'-bithiazole, 300 ml. DMAc, and 3 g. Raney nickel were placed in a bomb and pressured to 2700 p.s.i. at 30° C. The bomb was repressured to 3700 p.s.i. at 50° C.; after five hours at 120° C. the pressure was 3100 p.s.i. The bomb was cooled, vented and the contents of the bomb filtered. The filtrate was poured into 2 liters water at 50° C. and the product collected, washed in 500 ml. water, filtered off and dried 16 hours at 50° C. in vacuum oven. Thus, 23 g. or product, M.P. 275–278°C. was collected. The process above was repeated three times to yield 71 g. of crude diamine.

C. The crude diamine of section B above was purified by dissolving 23 g. of the diamine in 1 liter of water at 90° C. containing 25 ml. concentrated hydrochloric acid, heating the solution to the boil, filtering, and making the filtrate basic with 4 N sodium hydroxide solution. The mixture was cooled 30 minutes, then the diamine was collected, washed with 100 ml. water, dried 16 hours at 50° C. in a vacuum oven. Two more batches of crude diamine were purified in the above manner to yield a total of 68 g. of product, which was recrystallized from 500 ml. DMAc, washed with 50 ml. methanol, dried in a vacuum oven at 50° C. for 16 hours to yield 53.5 gm. of pure diamine, M.P. 280–283° C.

A. A solution of 10.5 g. (0.03 mole) diamine A in 100 ml. DMAc containing 6 percent dissolved lithium chloride was cooled to −30° C. and 6.09 g. (0.03 mole) isophthaloyl chloride was added with stirring. After 15 minutes the solution was allowed to warm to 0° C. and after an additional 15 minutes the solution was allowed to warm to room temperature. The solution became so viscous that it became necessary to add another 50 ml. solvent. After 3 hours, the solution was neutralized by addition of a slurry of 1.5 g. lithium hydroxide in 25 ml. DMAc. Two additional runs of the same size were made in the above manner. Polymer from each run was isolated by addition of water to a dilute solution of polymer. After washing and drying, a total of 40.1 g. polymer was collected having an inherent viscosity of 2.4. Fiber spun from the polymer above and drawn at 300° C. was found to have the following physical properties:

| | |
|---|---|
| Denier per filament | 4.9 |
| Tension _____g.p.d. | 7.75 |
| Elongation _____percent | 6.6 |
| Initial modulus _____g.p.d. | 168 |

Tension at, ° C.: Grams per denier

| | |
|---|---|
| 200 | 4.51 |
| 300 | 3.08 |
| 350 | 2.43 |
| 400 | 2.34 |
| 450 | 2.08 |
| 500 | 0.36 |

Other pertinent fiber data were: round cross-section, high order as indicated by X-ray, a melting point of 550° C. in nitrogen for undrawn fiber according to DTA, less than 15 percent weight loss in air to 500° C. (TGA), less than 20 percent weight loss in nitrogen to 550° C. (TGA).

B. A solution of 1.75 g. (0.005 mole) diamine A in 15 ml. DMAc containing 5 percent dissolved lithium chloride was cooled to −30° C. and 1.02 g. (0.005 mole) terephthaloyl chloride was added. The solution was stirred 15 minutes at −30° C., and 15 minutes at 0° C. before the addition of another 5 ml. DMAc containing 6 percent dissolved lithium chloride. After 2 hours at room temperature, the mixture was neutralized with 0.25 g. lithium hydroxide slurried with 10 ml. DMAc containing 6 percent dissolved lithium hydroxide. The paste of polymer did not dissolve upon addition of 0.5 g. lithium chloride and heating of the paste to 80° C. Precipitation of the polymer in water, followed by washing and drying of the polymer gave a yield of 2.0 g. of very thermally stable material. Film showed little or no effect upon being heated to 435° C. in air; unoriented films heated to 525° C. for 3 minutes in air began to char but were still flexible.

C. A solution of 1.75 g. (0.005 mole) diamine A in 20 ml. DMAc containing 5 percent dissolved lithium chloride was cooled to —30° C. and 1.26 g. (0.005 mole) 2,6-naphthalenedicarbonyl chloride was added. The solution was stirred at —30° C. for 15 minutes, then at 0° C. for 30 minutes. After 2 hours, the paste of polymer and solvent was neutralized with 0.24 g. lithium hydroxide slurried with 5 ml. DMAc containing 5 percent dissolved lithium chloride. The polymer was isolated by pouring the above mixture into water, washing and drying the resulting precipitate.

D. The procedure of section C was repeated using 1.39 g. of 4,4'-bibenzoyl chloride instead of 2,6-naphthalenedicarbonyl chloride.

E. A solution of 1.05 g. (0.003 mole) diamine A in 9 ml. DMAc containing 6 percent dissolved lithium chloride was cooled to —30° C. and 1.03 g. (0.003 mole) 4,4'-sulfonebibenzoyl chloride was added. A very viscous, clear solution was obtained even when the solution was allowed to warm to room temperature. Film prepared from this polymer was thermally stable.

EXAMPLE III

This example shows the preparation of 5',5'-di(3-aminophenyl)-2,2' - bis(1,3,4-oxadiazolyl), diamine B, used to prepare the polymers illustrated in Example IV.

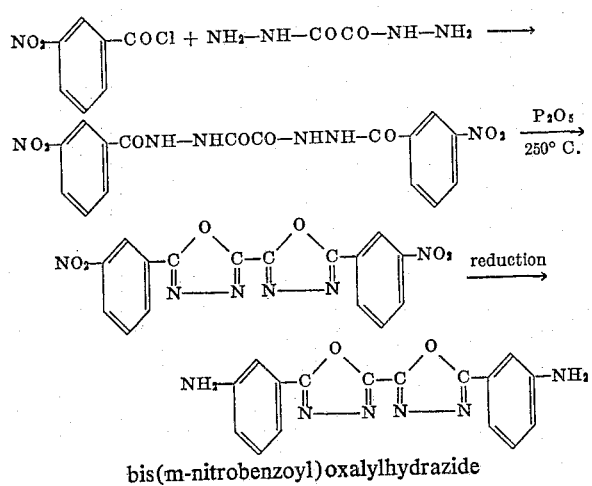

bis(m-nitrobenzoyl)oxalylhydrazide

A. A slurry of 5.9 g. of oxalic dihydrazide in 150 ml. water was stirred rapidly in a blender jar and 19 g. m-nitrobenzoyl chloride in 25 ml. tetrahydrofuran was added. Next, 11 g. of sodium carbonate was added and the mixture was stirred rapidly for 10 minutes. The slurry was acidified with dilute hydrochloric acid, filtered and the product washed with 700 ml. hot water. The dried material weighed 16.9 g., M.P. 306–310° C. A pure material, M.P. 312–314° C. was obtained upon recrystallization from DMAc.

5,5'-di(3-nitrophenyl)-2,2'-bis(1,3,4-oxadiazolyl)

B. Treatment of 9 g. of the product of section A above with an equal portion of phosphorous pentoxide at 250° C. for 2 hours followed by water, gave 6.7 g. of material, M.P. 235–258° C. Recrystallization of this crude product from 60 ml. dimethylformamide (DMF) gave 4.5 g. pure material, M.P. 275–278° C.

Analysis.—Calc'd: C, 50.58; H, 2.10; N, 22.11. Found: C, 50.47, 50.59; H, 2.22, 2.25; N, 22.16, 22.17.

5,5'-di(3-aminophenyl)-2,2'-bis(1,3,4-oxadiazolyl)

C. A reduction of the dinitro compound of section B above was performed by placing 4.5 g. of dinitro compound in a solution of 15 g. stannous chloride dihydrate in 18 ml. concentrated hydrochloric acid and 30 ml. ethanol. After a 45 minute reflux period, the swollen solids were washed in ethanol, slurried with aqueous sodium hydroxide solution, washed in water and dried. The resulting crude diamine B had a M.P. of 330–333° C.; pure diamine B., M.P. 339–341° C., was obtained upon recrystallization from ethylene glycol monomethyl ether.

Analysis.—Calc'd: C, 60.00; H, 3.77; N, 26.23. Found: C, 59.06, 59.27; H, 3.58, 3.74; N, 25.69, 25.76.

EXAMPLE IV

Polymers prepared according to this example have the following structure:

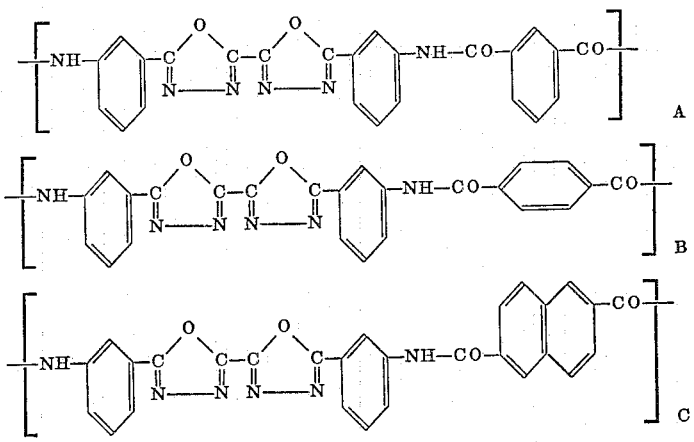

A. A solution of 0.16 g. (0.0005 mole) diamine B in 2 ml. DMAc containing 6 percent dissolved lithium chloride was cooled to —30° C. and 0.102 g. (0.0005 mole) isophthaloyl chloride was added. The viscous solution obtained was stirred at —30° C. for 5 minutes, then at 0° C. for 15 minutes, and at room temperature for 2 hours. The solution was neutralized with lithium hydroxide and cast into film. After the dissolved salts were removed from the film and the film was dried, a tough gray film was obtained. The film readily increased in length when drawn at elevated temperatures and do not soften until heated to temperatures in excess of 300° C.

B. A solution of 0.48 g. (0.0015 mole) diamine B in 8 ml. DMAc containing 6 percent dissolved lithium chloride was colled to —30° C. and 0.305 g. (0.0015 mole) terephthaloyl chloride was added. The viscous solution was stirred 15 minutes at —30° C., then 15 minutes at 0° C., and finally overnight at room temperature. Next, 0.072 g. of lithium hydroxide was added to neutralize the solution, which was then cast onto a glass plate. A film obtained by evaporation of solvent, soaking out dissolved salts followed by air drying, was tough and clear; the film did not soften until heated in excess of 300° C.

C. A solution of 0.64 g. (0.002 mole) diamine B in 4 ml. DMAc containing 6 percent dissolved lithium chloride was cooled to −30° C. and 0.505 g. (0.002 mole) 2,6-naphthalenedicarbonyl chloride was added. A paste of solids was obtained; addition of another 4 ml. of solvent gave a dope which was spread to a film.

EXAMPLE V

This example illustrates the preparation of intermediates used to prepare the polymers of Example VI.

Preparation of diamine D

A mixture of 21 g. I, 1 g. of Raney nickel, and 300 ml. DMAc was placed in an Aminco hydrogenation apparatus; the system was pressurized with hydrogen to 2000 p.s.i. The temperature was raised to 120° C. and the pressure maintained at 2600 p.s.i. for 5 hours. The bomb was cooled to 70° C., vented, and the contents of the bomb filtered. The filtrate was poured into 1 liter of benzene and the diamine D collected; the melting point of the crude diamine D was 276–280° C. Diamine D recrystallized from ethylene glycol monomethyl ether had a M.P. of 280–281° C.

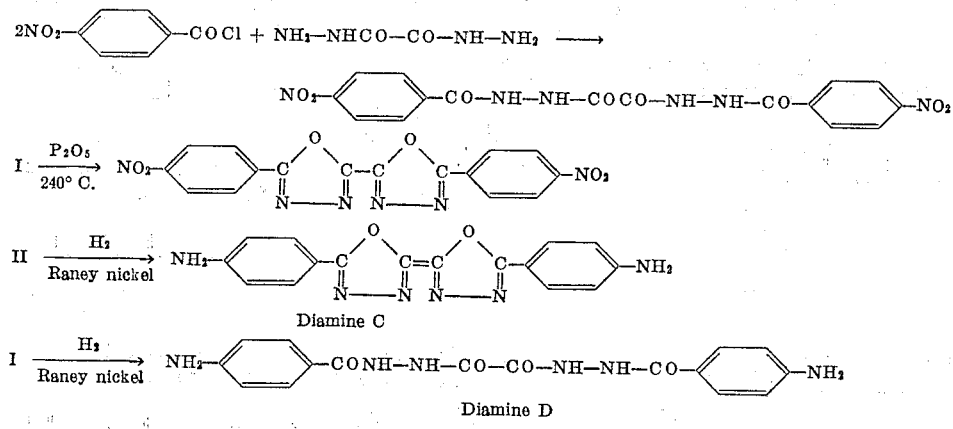

Preparation of I

A solution of 95 g. (0.51 mole) mole p-nitrobenzyl chloride in 125 ml. tetrahydrofuran was added to 29.5 g. (0.25 mole) ovalic dihydrazide slurried in 750 ml. ice-water and the mixture stirred rapidly while 55 g. of sodium carbonate was added. After 15 minutes the mixture was made acid, filtered, and washed with hot water. The dried product, I, weighed 96.0 g. (92.3 percent yield); the melting point was 312–314° C.

Preparation of II

A 23.4 portion of I was heated to 240° C. with an excess of P₂O₅ for 4 hours (with occasional shaking), then water and ice was added to the cooled mixture. The product was filtered and dried to yield 11.7 g. of crude product; a recrystallization from 370 ml. DMAc gave 9.7 g. of pure II, M.P. 358–360° C. A repeat experiment using 20 g. of I gave 15 g. of II, M.P. 359–361° C. Repeat runs gave comparable results.

Analysis.—Calc'd: C, 50.58; H, 210; N, 22.11. Found: C, 50.58, 50.75; H, 2.26, 2.29; N, 22.16, 22.30.

Preparation of diamine C

A mixture of 38 g. II, 2 g. Raney nickel, and 300 ml. DMAc was placed in an Aminco hydrogenation apparatus. The system was pressurized to 2000 p.s.i. with hydrogen and heated to 120° C. for a period of four hours, with shaking. The bomb was cooled, the contents of the flask were heated to the boil, and the slurry filtered. The filtrate was poured into hot water, the diamine C collected and dried (M.P. 400° C., dec.).

EXAMPLE VI

Polymers prepared according to this example have the following structure:

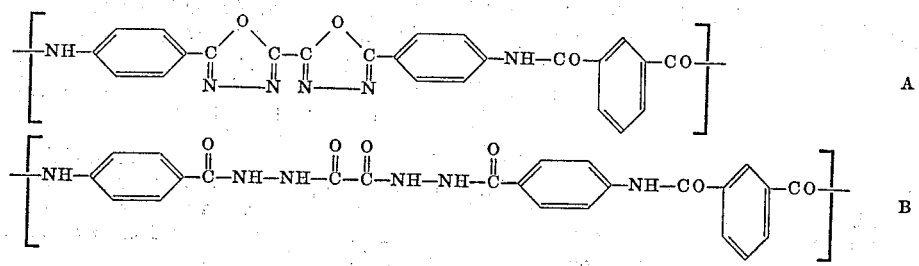

A. A slurry of 1.60 g. (0.005 mole) diamine C in 10 ml. DMAc containing 5 percent dissolved lithium chloride was cooled to 0° C. and 1.01 g. (0.005 mole) isophthaloyl chloride added with stirring. The solution obtained was viscous but polymer shortly began to precipitate. The slurry was diluted by the addition of 13 ml. DMAc containing 5 percent dissolved lithium chloride and was heated to 60° C. The polymer was precipitated into water, collected and dried.

B. A solution of 0.89 g. (0.0025 mole) diamine D in 3.6 ml. DMAc containing 5 percent dissolved lithium chloride was cooled to −30° C. and 0.51 g. (0.0025 mole) isophythaloyl chloride added with stirring. The solution was allowed to warm to 0° C., then to room temperature, and finally was heated to 50° C. before it was spread on a glass plate. The film obtained was brittle. Removal of water from polymer B (Example VI) by chemical treatment or heating above 300° C. converted it into polymer A (Example VI).

The foregoing detailed description has been given for clearness of understanding only, and unnecessary limitations are not to be construed therefrom. The invention is not to be limited to the exact details shown and described since obvious modifications will occur to those skilled in the art, and any departure from the description herein that conforms to the present invention is intended to be included within the scope of the claims.

I claim:
1. An amide-heterocyclic polymer composed of regularly recurring structural units of the formula

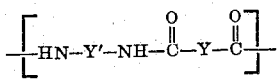

wherein Y' and Y are selected from the group consisting of Ar and Ar-X—X-Ar wherein Ar is a divalent hydrocarbon aromatic radical oriented other than ortho, X is a divalent 5 or 6 ring member heterocyclic radical containing from 1 to 3 hetero elements selected from As, N, O, P, S and Se, wherein all occurrences of X in the structural unit must be the same, and wherein at least one Ar-X—X-Ar radical must be present in each recurring structural unit, and wherein there is at least one plane of symmetry in each repeating unit.

2. A fiber-forming amide-heterocyclic polymer composed of regularly recurring structural units of the formula

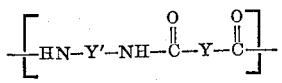

wherein Y' and Y are selected from the group consisting of Ar and Ar-X—X-Ar wherein Ar. is a divalent hydrocarbon aromatic radical oriented other than ortho and containing from 6 to 15 carbon atoms, X is a divalent 5 or 6 ring member heterocyclic radical containing from 1 to 3 hetero elements selected from As, N, O, P, S, and Se wherein all occurrences of X in the structural unit must be the same, wherein at least one Ar-X—X-Ar radical must be present in each recurring structural unit, and wherein there is at least one plane of symmetry in each repeating unit.

3. An amide-heterocyclic polymer composed of regularly recurring structural units of the formula

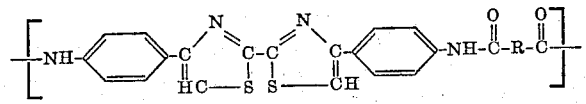

wherein R is a divalent aromatic radical oriented other than ortho selected from the group consisting of

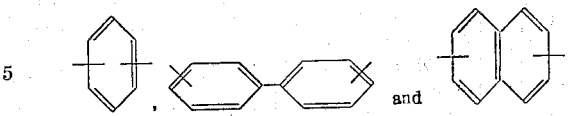

4. An amide-heterocyclic polymer composed of regularly recurring structural units of the formula

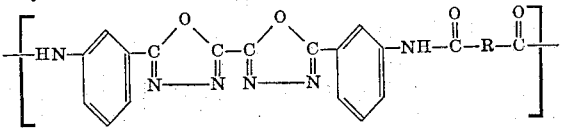

wherein R is a divalent aromatic radical oriented other than ortho selected from the group consisting of

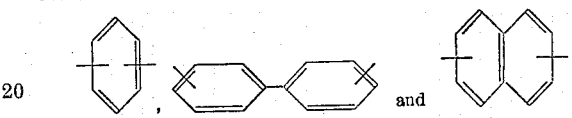

5. An amide heterocyclic polymer composed of regularly recurring structural units of the formula

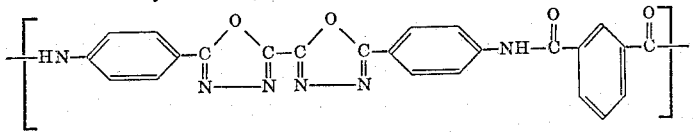

6. An amide-heterocyclic polymer composed of regularly recurring structural units of the formula

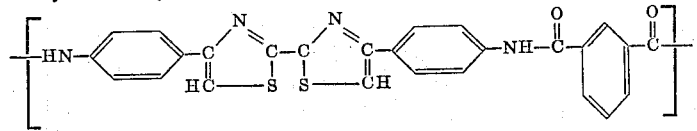

7. An amide-heterocyclic polymer composed of regularly recurring structural units of the formula

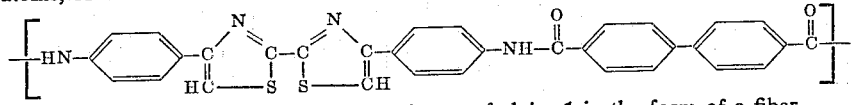

8. The polymer of claim 1 in the form of a fiber.
9. The polymer of claim 1 in the form of a film.
10. An amide-heterocyclic polymer intermediate polymer composed of regularly recurring structural units of the formula

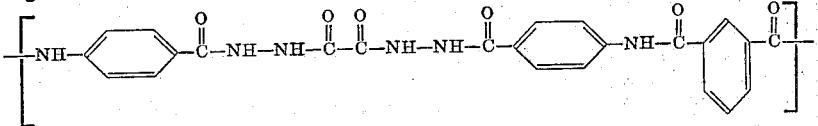

11. An amide-heterocyclic polymer composed of regularly recurring structural units of the formula

References Cited

UNITED STATES PATENTS 3,049,518   8/1962   Stephens _____ 260—78
3,179,635   4/1965   Frost et al. _____ 260—78

WILLIAM H. SHORT, *Primary Examiner.*

H. D. ANDERSON, *Assistant Examiner.*